United States Patent
Lambert et al.

(10) Patent No.: US 9,594,414 B2
(45) Date of Patent: Mar. 14, 2017

(54) AUXILIARY POWER SHUTDOWN

(75) Inventors: Timothy M. Lambert, Austin, TX (US); Johan Rahardjo, Austin, TX (US); Tracy Davis, Georgetown, TX (US); John S. Loffink, Austin, TX (US); Elie Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1106 days.

(21) Appl. No.: 12/577,866

(22) Filed: Oct. 13, 2009

(65) Prior Publication Data

US 2011/0087910 A1    Apr. 14, 2011

(51) Int. Cl.
*G06F 1/26* (2006.01)
*G06F 1/32* (2006.01)

(52) U.S. Cl.
CPC ............... *G06F 1/263* (2013.01); *G06F 1/32* (2013.01)

(58) Field of Classification Search
USPC .................................. 713/300, 320, 323, 324
See application file for complete search history.

(56) References Cited

U.S. PATENT DOCUMENTS

| | | | |
|---|---|---|---|
| 4,673,824 A * | 6/1987 | Pepper | 307/64 |
| 7,180,776 B1 * | 2/2007 | Wennekamp | G11C 7/24 326/38 |
| 7,774,633 B1 * | 8/2010 | Harrenstien et al. | 713/323 |
| 2002/0104031 A1 * | 8/2002 | Tomlinson | G06F 1/28 713/320 |
| 2005/0081074 A1 * | 4/2005 | Chheda et al. | 713/320 |
| 2007/0083774 A1 | 4/2007 | Baurer et al. | |
| 2007/0169088 A1 | 7/2007 | Lambert et al. | |
| 2008/0072090 A1 | 3/2008 | O'Connor et al. | |

OTHER PUBLICATIONS

PMBus Power System Management Protocol Specification Part I—General Requirements, Transport and Electrical Interface and Part II—Command Language, Revision 1.1, Feb. 5, 2007, System Management Interface Forum, Inc.*
DELL, Manuals, iDRAC Overview, 5 pages, printed Aug. 4, 2008.

* cited by examiner

*Primary Examiner* — Paul Yanchus, III
(74) *Attorney, Agent, or Firm* — Terrile, Cannatti, Champbers & Holland, LLP; Stephen A. Terrile (57) ABSTRACT

An auxiliary power control system for enabling a software command that a management controller sends to the power supply to shut down auxiliary power. Such a power control system enables an AC cycle without needing to physically remove an AC power cord and provides additional power savings when a system is not in use. In certain embodiments, the auxiliary power control system includes a paradigm of a main power state, an auxiliary power state and a sub-auxiliary state. In this system many of the power states and wake vents apply to the auxiliary power state in addition to the main power state.

12 Claims, 7 Drawing Sheets

AUXILIARY POWER SHUTDOWN

BACKGROUND OF THE INVENTION

Field of the Invention

The present invention relates to information handling systems and more particularly to auxiliary power shutdown and power up for a server type information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are powered via power supplies. Often, especially in server type information handling systems, multiple power supplies are used to provide power redundancy.

It is often desirable in the field and in development to perform an alternating current (AC) cycle an information handling system platform. By AC cycling, an information handling system removes both main and auxiliary power from the perspective of electronics downstream of the power supply for a set period of time and then restores the auxiliary power which in turn resumes the appropriate main power state. Auxiliary power usually powers logic such as a blade management controller (BMC), a remote access controller (RAC), a complex programmable logic device (CPLD), as well as various sensors and microcontrollers throughout the server type information handling system. Whereas main power is for the host processors, memory, I/O type chipsets, hard drives, etc.

One example of where an AC cycle is desirable is when updates are provided to a system CPLD. In this situation, whereas the CPLD can be remotely updated, it is often necessary for an administrator to physically perform an AC cycle on each server type information handling system via removing and reattaching the power cables. In server type information handling systems, on the fly reprogramming of CPLDs and resuming a last state is a complex sequence to accomplish reliably and in some cases is not even possible. Also, it is important when main and auxiliary power are present to maintain the state of all outputs. Maintaining the state may be accomplished by locking the output pin states or continually executing the preprogrammed logic until the newly updated logic takes effect. This process often required an AC cycle of the information handling system.

Also, during development and test of server type information handling systems, AC cycle testing can be a stressful test that is accomplished via external (and often expensive) boxes that intercept and control the AC power as well as clients with host communication for confirmation of a good boot.

Cycling AC may also provide a recovery mechanism for server management failure whenever one of the state machines enters an unknown state. For example, state machines within the remote access controller, field programmable gat arrays (FPGAs) or CPLDs may be reset into a known state by performing an AC cycle.

Also, in certain server systems, the auxiliary power is becoming larger and larger. For example, in certain server type information handling systems, a system may draw up to 100 Watts of power under a virtual standby and greater then 30 Watts under auxiliary power.

SUMMARY OF THE INVENTION

In accordance with the present invention, an auxiliary power control system for enabling a software command that a management controller sends to the power supply to shut down auxiliary power is set forth. Such a power control system enables an AC cycle without needing to physically remove an AC power cord and provides additional power savings when a system is not in use. In certain embodiments, the auxiliary power control system includes a paradigm of a main power state, an auxiliary power state and a sub-auxiliary state. In this system many of the power states and wake vents apply to the auxiliary power state in addition to the main power state.

More specifically, in certain embodiments, the sub-auxiliary power state is provided via a capacitor coupled to the auxiliary power source, or in certain other embodiments may be a gated auxiliary power rail which includes very low power control logic. Also, in certain embodiments, any of a plurality of events may cause the system to transition to the auxiliary power state from the sub-auxiliary power state. These events include a sub-auxiliary off time, a real time clock based auxiliary wake event, an auxiliary ring indication from an embedded subsystem serial port or a resume from last auxiliary power state type event.

In various embodiments, software, CPLD update utilities and firmware can initiate an auxiliary power cycle via a management controller (such as a remote access controller, a blade management controller or a chassis management controller) which would drive auxiliary power control system control logic (such as power field effect transistors (FETs)).

Also, in other certain embodiments, to provide a coordinated shutdown of auxiliary power to a motherboard (i.e., a planar board), an information handling system is placed into a standby mode of operation. When the system is in the standby mode of operation, an administrator activates console control of a system simulated AC power cycle. Next, a command to shut down auxiliary power at the power supply (which may be e.g., manufacturer specific) is sent via broadcast addressing to PM Bus enabled power supplies. The broadcast mode insures that all power supplies receive and react to the message at the same time. Next, by field effect transistor (FET) ORing of the Auxiliary power, the power supply units (PSUs) remove power to the system for a designated amount of time. Alternately, in certain embodiments, the manufacturer specific command may be designed with a numeric field for specifying the duration of the power removal. After power is restored to the system, a complex programmable logic device (CPLD), a remote access controller such as the integrated Dell remote access controller (iDRAC) available from Dell Inc., and related circuitry power up normally.

In certain other embodiments, a centralized auxiliary power control may be provided to allow additional wake methods in addition to time based wake methods. More specifically, an auxiliary exact power gating control is provided to the power supply units which enables, under control of the auxiliary power control, a large portion of the power consuming logic of the power supply unit (i.e., power supply logic that is not associated with the auxiliary power control) to be gated off and a small subset of the logic that control the power gating remains powered via a low power signal (e.g., sub-auxiliary power). The subset of the logic awaits a wake signal that is generated by the centralized auxiliary power control. Upon receipt of the wake signal, the subset of the logic powers up the power consuming logic of the power supply.

Such a system provides a plurality of advantages. For example, the FET switch used for gating power is generally present in many known power supplies, so no additional power consumption or component cost is incurred for switching through this method. Additionally, using this method, the entire planar Auxiliary subcircuit power is removed, causing the entire system to follow predictable behavior as if an AC removal had just occurred, including normal power up sequences and resets. The system also provides an improved customer experience because the customer does not have to cycle the AC cord after a CPLD reset.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
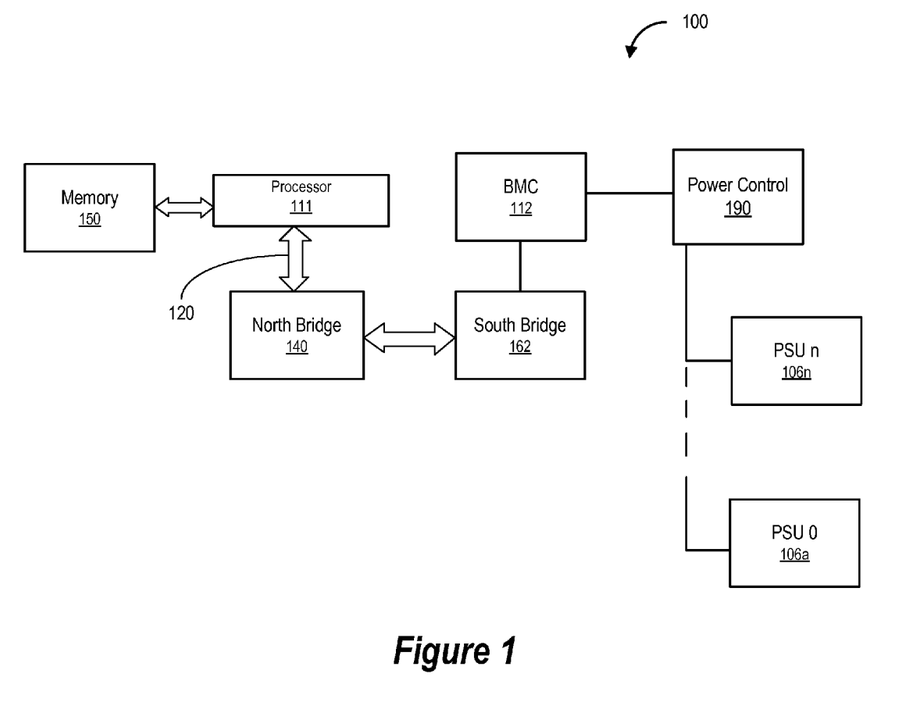
FIG. 1 shows a block diagram of an information handling system having a power control system.

Referring to FIG. 1, a block diagram of an information handling system 100 having a power control system is shown. More specifically, a server type information handling system 100 having electronic components mounted on at least one printed circuit board (PCB) (motherboard not shown) and communicating data and control signals over signal buses is shown.

In one example embodiment, the information handling system 100 is a computer server system. The information handling system 100 includes a plurality of power supply units (PSUs) 106. Power is provided among the various components via, e.g., a power distribution device such as a power distribution board or a power distribution backplane (not shown).

The information handling system 100 may be coupled to other components such as keyboards, video displays and pointing devices. Typically the information handling system 100 will include more than one PSU 106 such that a redundant power source is provided. The PSU 106 power outputs are coupled via the power distribution device for distribution.

The information handling system 100 includes a processor 111 (or a plurality of processors), a north bridge 140 and a main system memory 150. The north bridge 140 is coupled to the processor 110 via the host bus 120. The north bridge 140 is generally considered an application specific chip set that provides connectivity to various buses. The chip set may also be packaged as an application specific integrated circuit (ASIC). Another bus, such as industry standard buses or proprietary buses, e.g., ISA, SCSI, I.sup.2C, SPI, USB, LPC buses may be coupled to the north bridge 140 through a south bridge (bus interface) 162.

The information handling server system 100 also includes an auxiliary power control system 190. The auxiliary power control system 190 is coupled to the power supply units 106 and enables a command (such as a software command) from a management controller (such as the BMC 112) to the power supplies to shut down auxiliary power (e.g., for a configurable period).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
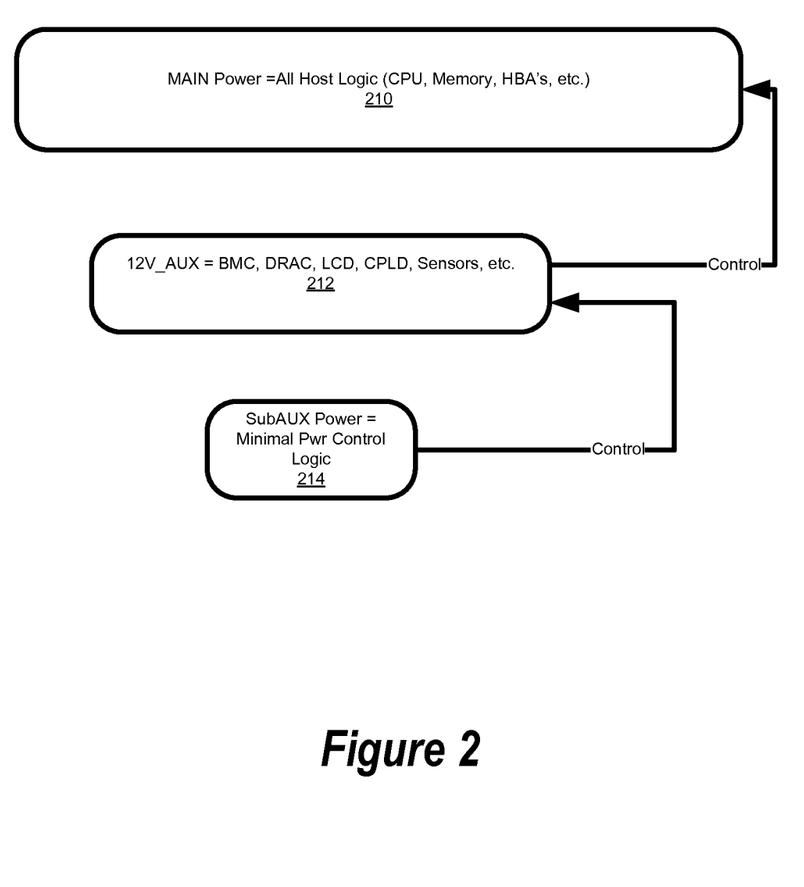
FIG. 2 shows a block diagram of an alternate power hierarchy.

Referring to FIG. 2 a block diagram of a power hierarchy is shown. More specifically, the power hierarchy includes a main power level 210, an auxiliary power level 212 and a sub-auxiliary power level 214. The main power level 210 provides power to all host logic including processors, memory and host bus adapters (HBAs), etc. The auxiliary power level 212 provides power to auxiliary type components including baseboard management controller (BMC), Dell Remote access controller (DRAC), liquid crystal display (LCD) components, CPLD, and sensors, etc. The sub-auxiliary power level generates a sub-auxiliary power to power minimal power control logic. The sub-auxiliary power level 214 controls power to the auxiliary power level 212 and the auxiliary power level 212 controls power to the main power level 210.

Figure 3:
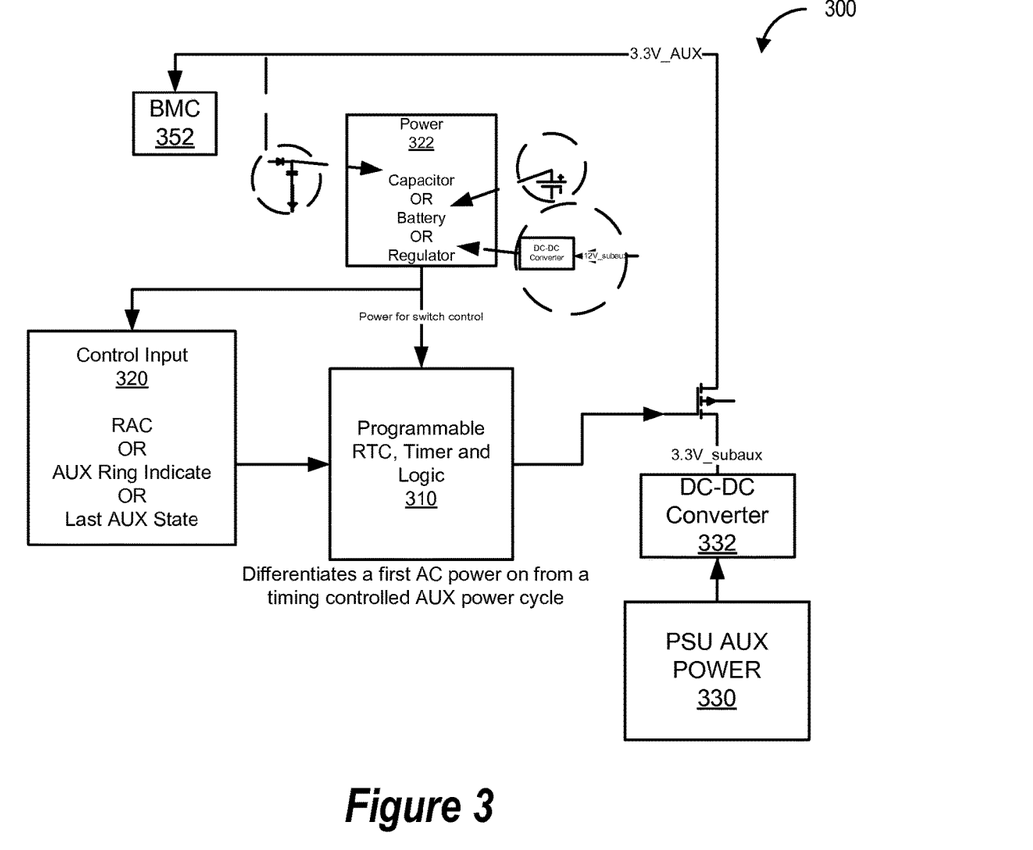
FIG. 3 shows a block diagram of an auxiliary power control system for implementing the alternate power hierarchy.

FIG. 3 shows a block diagram of an auxiliary power control system 300 for implementing the alternate power hierarchy. The power control system 300 implements a power FET method for enabling a software command that a remote access controller sends to the power supply to shut down auxiliary power for a configurable period.

More specifically, the power control system 300 includes a real time clock (RTC) module 310 as well as a FET 312. The RTC module 310 receives a control input 320 as well as a power input 322. The gate of the FET is coupled to the RTC module. The gate of the FET is coupled to a power supply unit auxiliary power output 330 and DC-DC converter 332. The FET is also coupled to a BMC module 352 and all other auxiliary powered circuits and devices within the system 100 such as circuits and devices that may be included within a CPLD.

The RTC module 310 includes a programmable RTC as well as a timer and control logic. The RTC module 310 differentiates a first AC power from a timing controlled auxiliary power cycle. The control input 312 may include an input from a remote access controller such as an iDRAC, from an auxiliary ring indication, or from the last auxiliary state. The power input 322 may be from a capacitor, a battery or a regulator. The power supply unit auxiliary power output 330 and DC-DC converter 332 provide a sub-auxiliary power (e.g., a power draw of 10× less than auxiliary power (e.g., less than 3 Watts)) to the FET 312.

Figure 4:
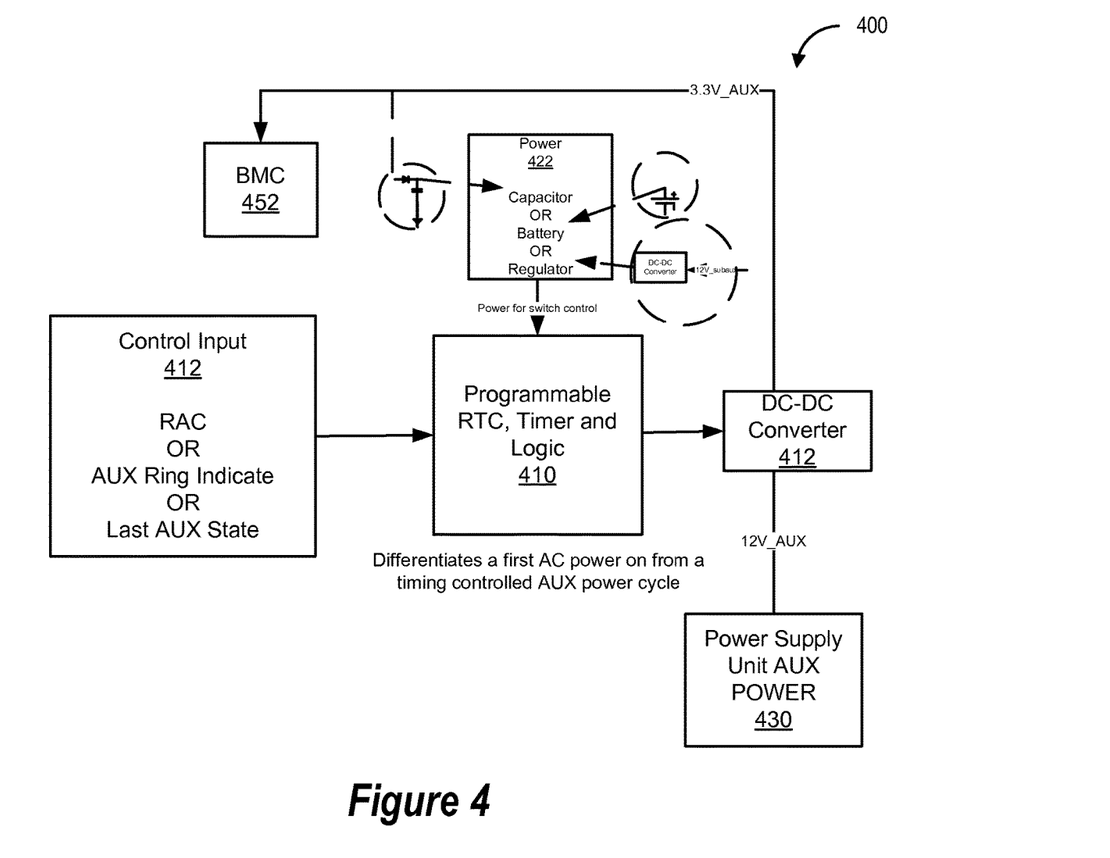
FIG. 4 shows a block diagram of another auxiliary power control system for implementing the alternate power hierarchy.

FIG. 4 shows a block diagram of another auxiliary power control system 400 for implementing the alternate power hierarchy. The power control system 400 implements a DC to DC method for enabling a software command that a remote access controller sends to the power supply to shut down auxiliary power for a configurable period.

More specifically, the power control system 400 includes an RTC module 410 as well as a DC to DC Converter 412. The RTC module 410 receives a control input 420 as well as a power input 422. The gate of the DC to DC Converter is coupled to the RTC module. The gate of the DC to DC Converter is coupled to a power supply unit auxiliary power output 430. The DC to DC Converter is also coupled to a BMC module 452 as well as all other auxiliary powered circuits and devices within the system such as circuits and devices that may be included within a CPLD.

The RTC module 410 includes a programmable RTC as well as a timer and control logic. The RTC module 410 differentiates a first AC power from a timing controlled auxiliary power cycle. The control input 412 may include an input from a remote access controller, from an auxiliary ring indication, or from the last auxiliary state. The power input 422 may be from a capacitor or a battery. The power supply unit auxiliary power output 430 provides an auxiliary power to the DC to DC Converter 412.

Figure 5:
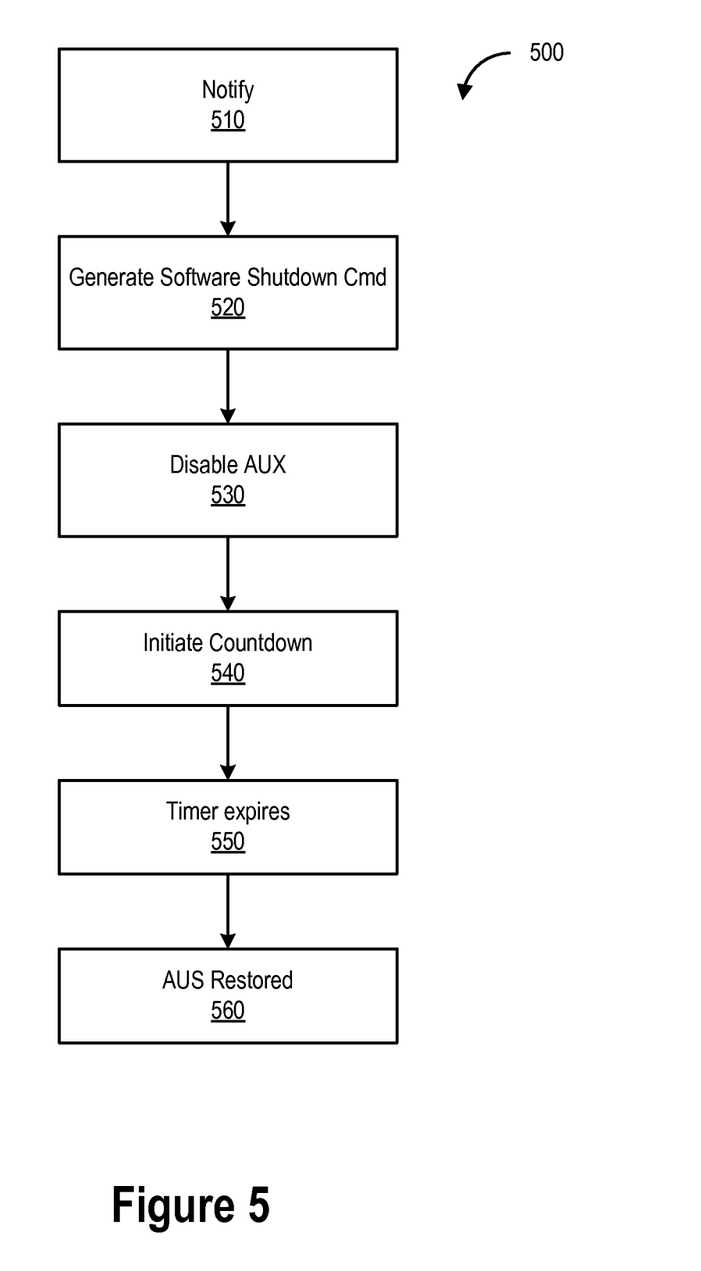
FIG. 5 shows a flow chart of the operation of the auxiliary power control systems for implement the alternate power hierarchy.

Referring to FIG. 5, a flow chart of the operation of the auxiliary power control systems 500, 600 for implementing the alternate power hierarchy is shown. More specifically, at step 510, the auxiliary power control system generates a notification to enter a low power auxiliary state of operation. Next, the centralized auxiliary power control system generates a software shutdown command at step 520. The system then disables the auxiliary power at step 530 and initiates a count at step 540. In alternate embodiments, rather than initiating a count, the system may use some other method of determining how long to place the system in the low power auxiliary state of operation.

Next, at step 550, the timer expires (or a determination is made to leave the low power auxiliary state of operation. At step 560, auxiliary power is restored to the information handling system.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Figure 6:
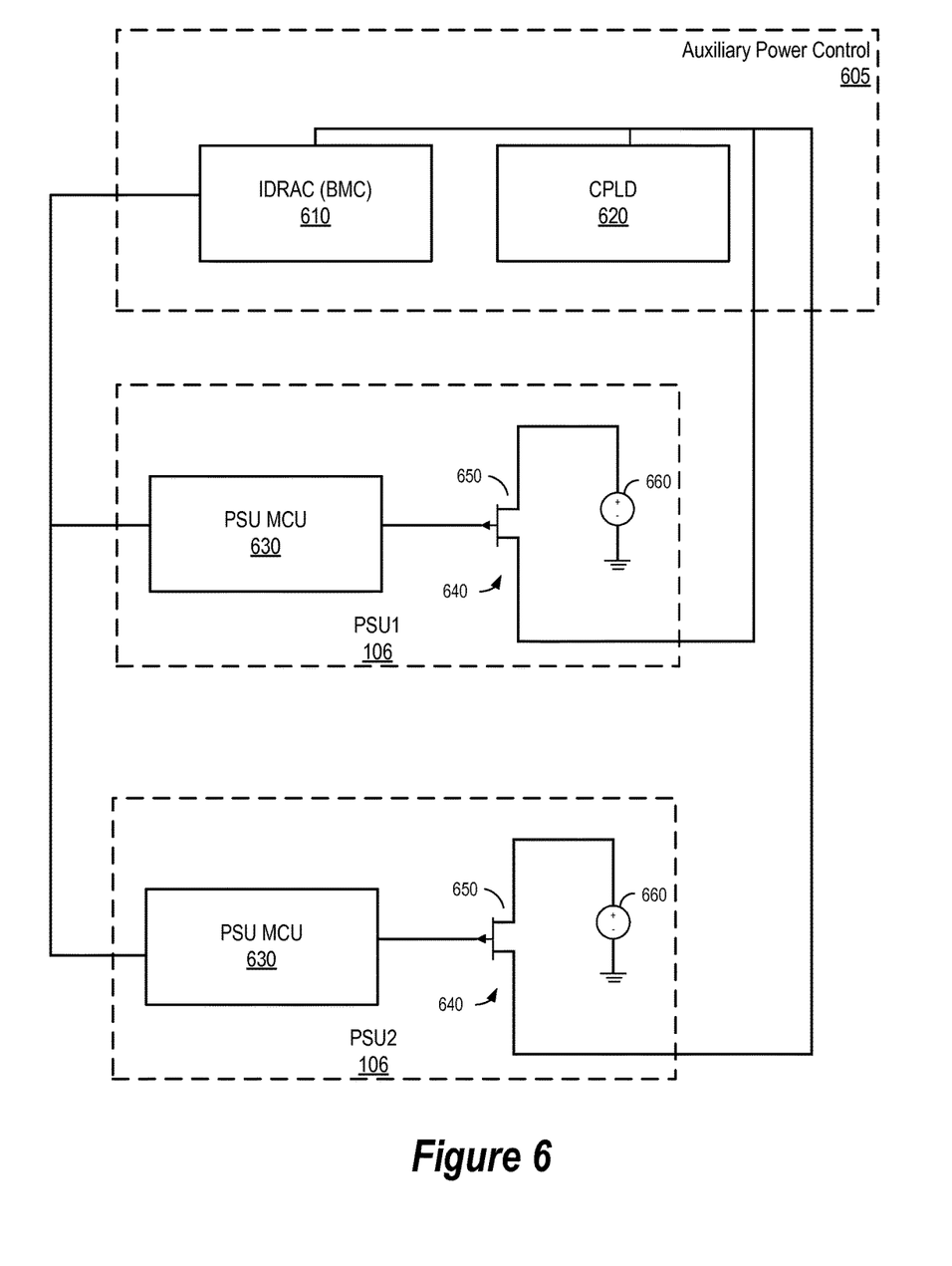
FIG. 6 shows a block diagram of an auxiliary power control system and a plurality of power supply units within an information handling system.

For example, referring to FIG. 6, a block diagram of an alternate auxiliary power control system and a plurality of power supply units 106 within an information handling system 100 is shown. More specifically, the auxiliary power control system 605 includes a remote access controller module 610 as well as a complex programmable logic device (CPLD) module 620. The remote access controller module 610 allows the auxiliary power control system 605 to interact with and communicate with a remote access controller such as an integrated Dell remote access controller (iDRAC) available from Dell Inc. The CPLD module 620 functions as a power control system and provides power control, power sequencing and wake event control.

Each of the power supply units 106 includes a power supply unit microcontroller unit (MCU) 630 as well as an auxiliary power circuit 640. Each MCU 630 includes an integrated processor, memory and peripherals capable of input and output for controlling the operation of the power supply unit 106.

The auxiliary power circuit 640 includes a transistor 650 as well as a direct current power source 660. In certain embodiments, the transistors include a field effect transistor (FET) type transistor. The direct current power source 660 is coupled between one of the current handling terminals of the transistor and ground. The other current handling terminal of the transistor is coupled to the auxiliary power signal. The control terminal of the transistor is coupled to the MCU 630.

Figure 7:
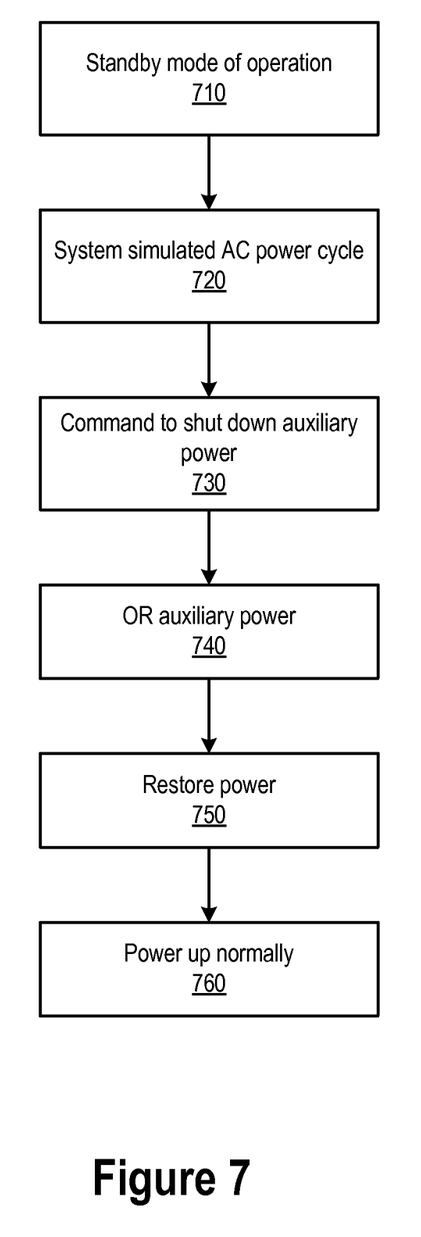
FIG. 7 shows a flow chart of the operation of a power control system.

Referring to FIG. 7, a flow chart of the operation of the alternate power control system is shown. More specifically, to provide a coordinated shutdown of auxiliary power to a motherboard (i.e., a planar board), an information handling system 100 is placed into a standby mode of operation at step 710. When the system is in the standby mode of operation, an administrator activates console control of a system simulated AC power cycle at step 720. Next a command to shut down auxiliary power at the power supply (which may be e.g., manufacturer specific) is sent via broadcast addressing to PM Bus enabled power supplies at step 730. The broadcast mode insures that all power supplies receive and react to the message at the same time. Next at step 740, by field effect transistor (FET) ORing of the Auxiliary power, the power supply units (PSUs) remove power to the system for a designated amount of time.

Alternately, in certain embodiments, the manufacturer specific command may be designed with a numeric field for specifying the duration of the power removal. After power is restored to the system at step 750, the CPLD, the remote access controller such as the integrated Dell remote access controller (iDRAC) available from Dell Inc., and related circuitry power up normally at step 760.

Such a system provides a plurality of advantages. For example, the FET switch used for gating power is generally present in many known power supplies, so no additional power consumption or component cost is incurred for switching through this method. Additionally, using this method, the entire planar Auxiliary subcircuit power is removed, causing the entire system to follow predictable behavior as if an AC removal had just occurred, including normal power up sequences and resets. The system also provides an improved customer experience because the customer does not have to cycle the AC cord after CPLD reset.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also, in the present invention, a transistor, such as a Field Effect Transistor, may be conceptualized as having a control terminal which controls the flow of current between a first current handling terminal and a second current handling terminal. Although transistors are frequently discussed as having a drain, a gate, and a source, in most such devices the drain is interchangeable with the source. This is because the layout and semiconductor processing of the transistor is symmetrical (which is typically not the case for bipolar transistors). For an N-channel transistor, the current handling terminal normally residing at the higher voltage is customarily called the drain. The current handling terminal normally residing at the lower voltage is customarily called the source. A sufficient voltage on the gate causes a current to therefore flow from the drain to the source. The gate to source voltage referred to in N-channel device equations merely refers to whichever diffusion (drain or source) has the lower voltage at any given time. For example, the "source" of an N-channel device of a bi-directional CMOS transfer gate depends on which side of the transfer gate is at a lower voltage. To reflect the symmetry of most N channel transistors, the control terminal is the gate, the first current handling terminal may be termed the "drain/source," and the second current handling terminal may be termed the "source/drain." Such a description is equally valid for a P channel transistor, since the polarity between drain and source voltages, and the direction of current flow between drain and source, is not implied by such terminology. Alternatively, one current handling terminal may be arbitrarily deemed the "drain" and the other deemed the "source", with an implicit understanding that the two are not distinct, but interchangeable.

Consequently, the invention is intended to be limited only by the spirit and scope of the appended claims, giving full cognizance to equivalents in all respects.

What is claimed is:

1. A method for providing a coordinated shutdown of auxiliary power comprising:
   placing an information handling system into a standby mode of operation, the information handling system comprising a system complex programmable logic device (CPLD), the system CPLD being configured to enable on the fly reprogramming and resuming a last state after the reprogramming, the system CPLD providing power control, power sequencing and wake event control functionality to the information handling system;
   activating console control of a system simulated power cycle;
   generating a command to shut down auxiliary power at a PM Bus enabled power supply, the command being sent via broadcast addressing to the PM Bus enabled power supply, the command comprising a manufacturer specific command, the manufacturer specific command comprising a numeric field, the numeric field specifying a duration of power removal; and,
   transitioning the PM Bus enabled power supply from an auxiliary power state to a sub-auxiliary power state so as to remove power from a rail of the auxiliary power supply until a predetermined condition occurs, the predetermined condition comprising removing power from the auxiliary rail of the power supply for a designated amount of time; and wherein
   a management controller initiates an auxiliary power cycle by generating the command to shut down auxiliary power;
   the sub-auxiliary power state is provided via a gated auxiliary power rail where the auxiliary power rail includes very low power control logic; and,
   the transitioning the PM Bus enabled power supply causes planar auxiliary subcircuit power to be removed from the information handling system, causing the information handling system to follow predictable behavior as if an AC removal had occurred to the information handling system.

2. The method of claim 1 further comprising:
   reinstating power from the rail of the auxiliary power supply when the predetermined condition occurs.

3. The method of claim 1 wherein:
   the sub-auxiliary power state is provided via a capacitor coupled to an auxiliary power source.

4. The method of claim 1 wherein:
   any of a plurality of events may cause the system to transition to the auxiliary power state from the sub-auxiliary power state.

5. The method of claim 4 wherein:
   the plurality of events comprise a sub-auxiliary off time, a real time clock based auxiliary wake event, an auxiliary ring indication from an embedded subsystem serial port or a resume from last auxiliary power state type event.

6. The method of claim 1 wherein:
   the removing power from the auxiliary rail of the power supply being by ORing auxiliary power with the power supply.

7. An apparatus for providing a coordinated shutdown of auxiliary power comprising:
  means for placing an information handling system into a standby mode of operation, the information handling system comprising a system complex programmable logic device (CPLD), the system CPLD being configured to enable on the fly reprogramming and resuming a last state after the reprogramming, the system CPLD providing power control, power sequencing and wake event control functionality to the information handling system;
  means for activating console control of a system simulated power cycle;
  generating a command to shut down auxiliary power at a PM Bus enabled power supply, the command being sent via broadcast addressing to the PM Bus enabled power supply, the command comprising a manufacturer specific command, the manufacturer specific command comprising a numeric field, the numeric field specifying a duration of power removal; and,
  means for transitioning the PM Bus enabled power supply from an auxiliary power state to a sub-auxiliary power state so as to remove power from a rail of the auxiliary power supply until a predetermined condition occurs, the predetermined condition comprising removing power from the auxiliary rail of the power supply for a designated amount of time; and wherein
  a management controller initiates an auxiliary power cycle by generating the command to shut down auxiliary power;
  the sub-auxiliary power state is provided via a gated auxiliary power rail where the auxiliary power rail includes very low power control logic; and
  the transitioning the PM Bus enabled power supply causes planar auxiliary subcircuit power to be removed from the information handling system, causing the information handling system to follow predictable behavior as if an AC removal had occurred to the information handling system.

8. The apparatus of claim 7 further comprising:
  means for reinstating power from the rail of the auxiliary power supply when the predetermined condition occurs.

9. The apparatus of claim 7 wherein:
  the sub-auxiliary power state is provided via a capacitor coupled to an auxiliary power source.

10. The apparatus of claim 7 wherein:
  any of a plurality of events may cause the system to transition to the auxiliary power state from the sub-auxiliary power state.

11. The apparatus of claim 10 wherein:
  the plurality of events comprise a sub-auxiliary off time, a real time clock based auxiliary wake event, an auxiliary ring indication from an embedded subsystem serial port or a resume from last auxiliary power state type event.

12. The apparatus of claim 7 wherein:
  the removing power from the auxiliary rail of the power supply being by ORing auxiliary power with the power supply.

* * * * *